United States Patent [19]
Jiang et al.

[11] Patent Number: 6,069,881
[45] Date of Patent: May 30, 2000

[54] METHOD AND APPARATUS FOR DETECTING AND DEALING WITH MALFUNCTIONING CDMA WIRELESS TERMINALS

[75] Inventors: Frances Lin Jiang, Whippany; Kyoung Il Kim, Bridgewater, both of N.J.

[73] Assignee: Lucent Technologies, Inc., Murray Hill, N.J.

[21] Appl. No.: 08/953,873

[22] Filed: Oct. 18, 1997

[51] Int. Cl.$^7$ .................................................. H04B 7/216
[52] U.S. Cl. ............................ 370/318; 455/522; 455/69
[58] Field of Search .............................. 455/522, 68, 69, 455/70; 370/318

[56] References Cited

U.S. PATENT DOCUMENTS

| | | | |
|---|---|---|---|
| 5,604,766 | 2/1997 | Dohi et al. | 375/200 |
| 5,790,940 | 8/1998 | Laborde et al. | 455/69 |
| 5,812,938 | 9/1998 | Gilhousen et al. | 455/69 |
| 5,873,027 | 2/1999 | Asano et al. | 455/67.3 |
| 5,940,743 | 8/1999 | Sunay et al. | 455/69 |
| 5,943,610 | 8/1999 | Endo | 455/69 |
| 5,991,284 | 11/1999 | Willeneger et al. | 370/335 |

*Primary Examiner*—Huy D. Vu
*Assistant Examiner*—Dung Trinh

[57] ABSTRACT

A method and apparatus for reasonably discriminating between an appropriately behaved wireless terminal and an inappropriately behaved wireless terminal is disclosed. In particular, some embodiments of the present invention are capable of reasonably discriminating between an appropriately behaved wireless terminal and an inappropriately behaved wireless terminal even though consecutive frames have heterogeneous rates (i.e., full-rate frames, half-rate frames, quarter-rate frames, etc.).

An illustrative embodiment of the present invention receives a frame from a wireless terminal and determines how many "gated-on" groups are in the frame. The illustrative embodiment next determines how many power-down commands should be issued or have been issued to the wireless terminal in response to the received frame. Next, the illustrative embodiment compares the number of power-down commands for the frame to the number of gated-on groups for the frame. When the number of power-down commands equals or exceeds the number of gated-on groups for the frame, then the frame is counted as a violator, which suggests that the wireless terminal is misbehaved.

23 Claims, 3 Drawing Sheets

100

6,069,881

METHOD AND APPARATUS FOR DETECTING AND DEALING WITH MALFUNCTIONING CDMA WIRELESS TERMINALS

FIELD OF THE INVENTION

The present invention relates to wireless telecommunications in general, and, more particularly, to a method and apparatus for detecting malfunctioning wireless terminals.

BACKGROUND OF THE INVENTION

FIG. 1 depicts a schematic diagram of a portion of a typical wireless telecommunications system in the prior art, which system provides wireless telecommunications service to a number of wireless terminals that are situated within a geographic region. The heart of a typical wireless telecommunications system is the Wireless Switching Center ("WSC"), which may also known as a Mobile Switching Center ("MSC") or Mobile Telephone Switching Office ("MTSO"). Typically the Wireless Switching Center is connected to a plurality of base stations that are dispersed throughout the geographic area serviced by the system and to the local and long-distance networks. The Wireless Switching Center is responsible for, among other things, establishing and maintaining calls between wireless terminals and between a wireless terminal and a wireline terminal, which is connected to the system via the local and/or long-distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topology of the terrain serviced by the system. Typically, each cell contains a base station, which comprises the radios and antennas that the base station uses to communicate with the wireless terminals in that cell and also comprises the transmission equipment that the base station uses to communicate with the Wireless Switching Center.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

When wireless terminal 101-1, wireless terminal 101-2 and base station 103-1 use Code Division Multiple Access ("CDMA") radio technology, it is paramount that each wireless terminal control the power with which it radiates its signal. Otherwise, a wireless terminal that radiates with too much power could cause a cacophony and swamp out the signals radiated by the other wireless terminals. Because it is so important that the radiated power of each CDMA wireless terminal be controlled, base station 103-1 continually provides commands to each wireless terminal directing the wireless terminal to increase or decrease the level with which it radiates. Furthermore, IS-95A Section 6.5 entitled "Malfunction Detection" states:

> To ensure that a mobile station transmits a spread spectrum signal which does not adversely affect system capacity, the mobile station shall respond to the Lock Until Power Cycled Order and Maintenance Required Order from the base station as specified in 6.6.2.4, 6.6.3.2 through 6.6.3.7, and 6.6.4.3 through 6.6.4.5. It is the responsibility of the base station to detect a mobile station transmission malfunction and to send the appropriate message.

In other words, each base station in the wireless telecommunications system is responsible for monitoring each mobile station (i.e., a wireless terminal) to ensure that the wireless terminal behaves in a manner that does not adversely affect the number of calls that the wireless telecommunications system is capable of handling. When the base station does detect that a wireless terminal is behaving in a manner that adversely affects the number of calls that the wireless telecommunications system is capable of handling, then the base station can transmit a violation message to the wireless terminal that instructs the wireless terminal to cease the offensive behavior. The violation message can direct the wireless terminal to stop radiating any signal until the wireless terminal is re-booted, or the violation message can direct the wireless terminal to stop radiating until the wireless terminal has been examined and repaired by a technician. The standard further requires that a wireless terminal must comply with the violation message from the base station to be compliant with IS-95A.

Although the IS-95A CDMA standard requires malfunction detection, the standard does not provide guidance on how to detect a malfunction or specifically what set of circumstances even constitute a "malfunction." It is, however, generally known in the prior art that a rogue CDMA wireless terminal that radiates too much power can adversely affect the number of calls that the wireless telecommunications system is capable of handling, and, as a result, elaborate techniques have been developed and are well-known in the prior art for regulating the power with which a CDMA wireless terminal radiates. But it is one matter to know how to monitor and regulate the radiated power of an appropriately behaved wireless terminal and it is quite another matter to know how to monitor a wireless terminal and to discriminate between an appropriately behaved wireless terminal that is merely radiating too much power and an inappropriately behaved wireless terminal that is "malfunctioning" and should be sent a violation message.

Therefore, the need exists for a technique that discriminates between an appropriately behaved CDMA wireless terminal and an inappropriately behaved or "malfunctioning" CDMA wireless terminal.

SUMMARY OF THE INVENTION

Some embodiments of the present invention are capable of reasonably discriminating between an appropriately behaved wireless terminal and an inappropriately behaved or "malfunctioning" wireless terminal. In particular, some embodiments of the present invention are capable of reasonably discriminating between an appropriately behaved wireless terminal and an inappropriately behaved wireless terminal even though consecutive frames transmitted by the wireless terminal have heterogeneous rates (i.e., full-rate frames, half-rate frames, quarter-rate frames, etc.).

An illustrative embodiment of the present invention receives a frame from a wireless terminal and determines how many "gated-on" groups are in the frame. The illustrative embodiment next determines how many power-down commands should be issued or have been issued to the wireless terminal in response to the received frame. Next, the illustrative embodiment compares the number of power-down commands for the frame to the number of gated-on groups for the frame. When the number of power-down commands equals or exceeds the number of gated-on groups for the frame, then the frame is counted as a violator, which suggests that the wireless terminal is misbehaving.

Furthermore, two parameters associated with another illustrative embodiment of the present invention, n and m, enable an operator of the embodiment to choose the likelihood that: (1) an appropriately behaved wireless terminal will be mistaken as an inappropriately behaved wireless terminal, (2) an inappropriately behaved wireless terminal will be mistaken as an appropriately behaved wireless terminal, and (3) the length of time that an inappropriately behaved wireless terminal will be permitted t o misbehave before a violation message is transmitted to it. In accordance with this embodiment of the present invention, the illustrative embodiment maintains statistics on whether the last m received frames have been counted as violators or non-violators, and transmits a violation message to the wireless terminal when n of the last m received frames have been counted as violators.

DETAILED DESCRIPTION

Figure 1:
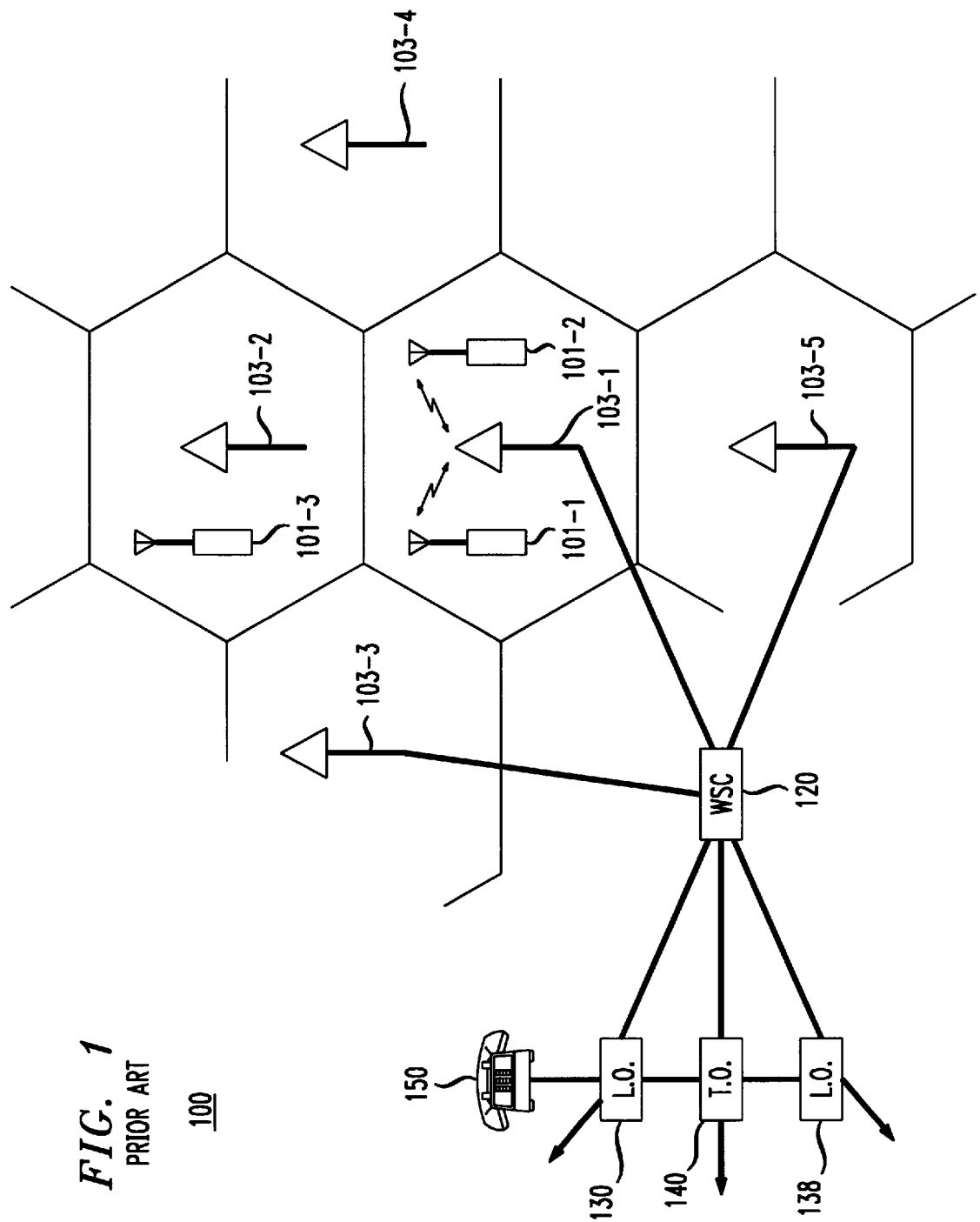
FIG. 1 depicts a schematic diagram of a wireless telecommunications system in the prior art.
Figure 2:
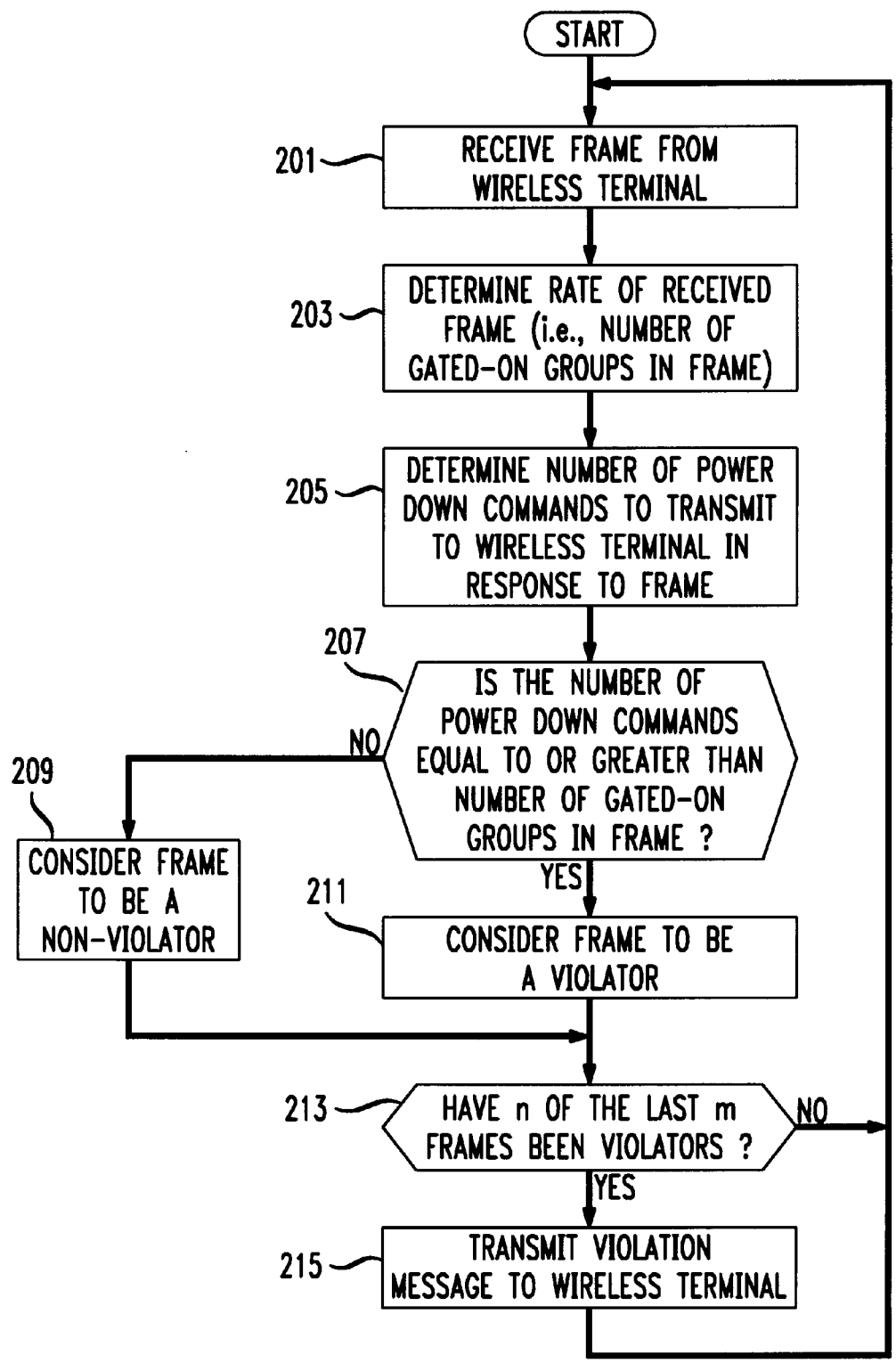
FIG. 2 depicts a flowchart of the illustrative embodiment of the present invention.

FIG. 2 depicts a flowchart of an illustrative embodiment of the present invention. The embodiment of the present invention is advantageously performed either in a radio in a base station or in the wireless switching center of a telecommunications system or in a combination of both, depending on the designer's choice. It will be clear to those skilled in the art whether the embodiment should be placed in the base station or in the wireless switching center or in a combination of both for a given implementation.

Figure 3:
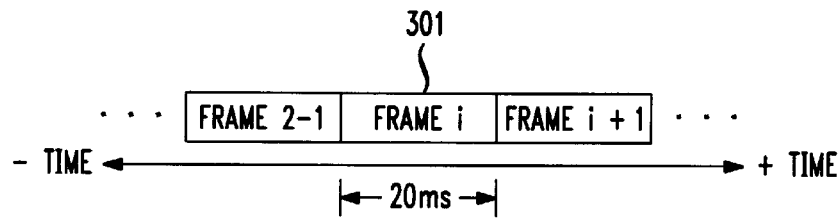
FIG. 3 depicts a stream of CDMA frames as they arrive from a wireless terminal.

At step 201, the illustrative embodiment receives a frame from a wireless terminal. When information (e.g., speech, data, control signals, video, multimedia, etc.) is to be transmitted from an IS-95A compliant CDMA wireless terminal, the information is partitioned into a series of temporally-disparate "frames," in well-known fashion. As depicted in FIG. 3, the wireless terminal transmits a frame to the base station every 20 milliseconds. Although the illustrative embodiment operates on one frame at a time, the illustrative embodiment advantageously maintains statistics on the last m frames received from that wireless terminal, where m is a whole number greater than 1.

Figure 4:
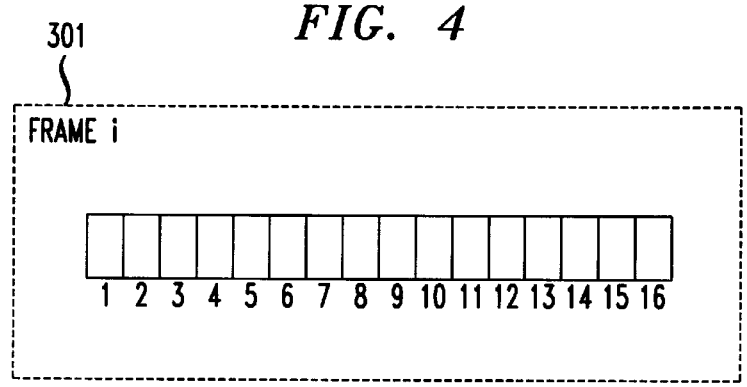
FIG. 4 depicts the 16 power control groups within a CDMA frame.

As depicted in FIG. 4, each frame is a data structure that comprises 16 temporally disparate "power control groups," in well-known fashion. Each group in the frame is itself a data structure that carries a portion of the information carried by the frame. The duration of a power control group is 1.25 milliseconds.

At step 203 in FIG. 2, the illustrative embodiment determines the rate of the received frame (i.e., the number of "gated-on" groups in the frame). Empirically, most telecommunications traffic fluctuates in quantity over time due to the natural temporal fluctuations in speech and other types of communication. In other words, the amount of information that needs to be transmitted between a wireless terminal and a base station varies considerably with time. For example, when a user of a wireless terminal is speaking, the amount of information to be transmitted is typically fairly high. In contrast, when the use is merely listening the amount of information to be transmitted is low in comparison.

In recognition of the pulsatile nature of telecommunications traffic, the IS-95A standard provides a mechanism for varying the amount of signal radiated from the wireless terminal based on the quantity of information that needs to be transmitted. This is advantageous for two reasons. First, when the wireless terminal has little information to transmit (e.g., because the user is listening, etc.), the wireless terminal need not transmit during the entire frame, which reduces the amount of "noise" seen by other CDMA receivers. And second, if the wireless terminal is not transmitting during the entire frame, the amount of power consumed by the wireless terminal is reduced, which extends the useful life of the wireless terminal's batteries.

The mechanism that the IS-95A standard provides for varying the amount of signal radiated from the wireless terminal is to either transmit or not transmit during successive power control groups. For example, when the wireless terminal has a great quantity of information to transmit, the wireless terminal may need the bandwidth capacity of all 16 power control groups in a frame, and, therefore, the wireless terminal will radiate during all 16 power control groups in that frame. In contrast, when the wireless terminal has little to transmit, the wireless terminal may need the bandwidth capacity of only 2 power control groups in the frame, and, therefore, the wireless terminal will radiate during only 2 power control groups and will not radiate, or will at least radiate at least 20 dB lower, during 14 power control groups in the frame.

When the wireless terminal radiates a group, that group is designated "gated-on," in well-known fashion. In contrast, when the wireless terminal is idle during a group, that group is designated "gated-off." The wireless terminal varies the number of power control groups radiated per frame on a frame-by-frame basis depending on the amount of information to be transmitted.

According to the IS-95A standard, a wireless terminal can radiate during all 16 power control groups in a frame, or can radiate during 8 power control groups and not radiate during the remaining 8, or can radiate during 4 power control groups and not radiate during the remaining 12, or can radiate during 2 power control groups and not radiate during the remaining 14. As is specified in Table 1, each of these different patterns is known by a designation such as "full-rate," half-rate," "quarter-rate," and "eighth-rate."

TABLE 1

| No. of Gated-On Groups | No. of Gated-Off Groups | Designation |
|---|---|---|
| 16 | 0 | Full-Rate |
| 8 | 8 | Half-Rate |
| 4 | 12 | Quarter-Rate |
| 2 | 14 | Eighth-Rate |

Figure 5:
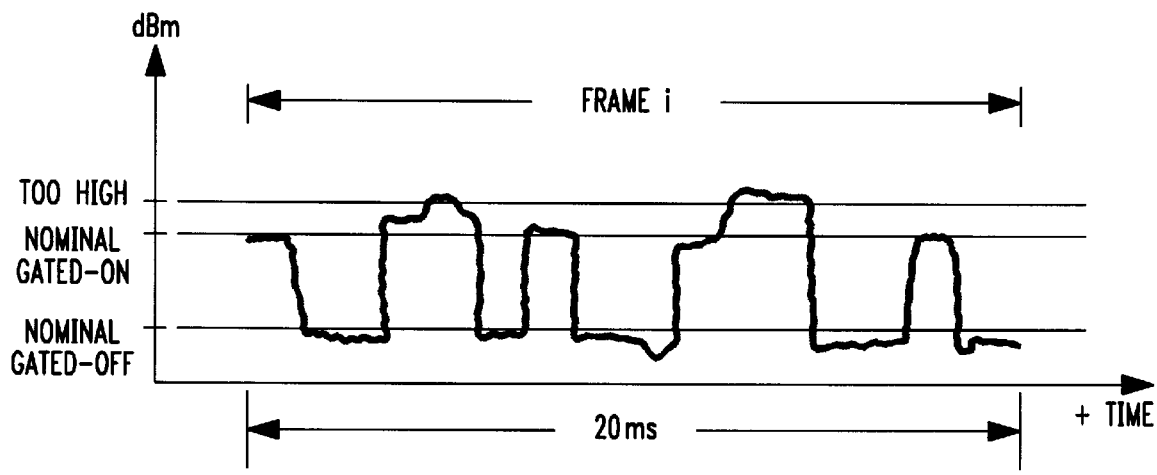
FIG. 5 depicts a graph of the signal strength versus time of an illustrative CDMA frame as received by a base station.

FIG. 5 depicts a graph of an illustrative frame as received by a base station in terms of received signal strength versus time. When the base station receives a frame, it does not know in advance whether the frame is a full-rate, half-rate, quarter-rate or eighth-rate frame but must examine the signal strength of the received signal versus time and consider that, in accordance with IS-95A, the minimum difference in signal strength between a gated-on group and a gated-off group is at least 20 dB. By visual examination of the frame in FIG. 5, it can be seen that group #1 is probably gated-on, group #2 is probably gated-off, group #3 is probably gated-off, etc. Table 2 summarizes, in full, the apparent status of each group in the frame in FIG. 5.

TABLE 2

| Group No. | Status |
| --- | --- |
| 1 | Gated-On |
| 2 | Gated-Off |
| 3 | Gated-Off |
| 4 | Gated-On |
| 5 | Gated-On |
| 6 | Gated-Off |
| 7 | Gated-On |
| 8 | Gated-Off |
| 9 | Gated-Off |
| 10 | Gated-On |
| 11 | Gated-On |
| 12 | Gated-On |
| 13 | Gated-Off |
| 14 | Gated-Off |
| 15 | Gated-On |
| 16 | Gated-Off |

Thus, it appears that 8 power control groups are gated-on and 8 power groups are gated-off, and, therefore, that the frame in FIG. 4 is a half-rate frame. In a sub-full-rate frame, the wireless terminal decides which power control groups are gated-on and which are gated-off based on a pseudo-random number sequence, in well-known fashion. When the base station knows the rate of the sub-full-frame and which power control groups are gated-on and which are gated-off, the base station can then decode the gated-on groups and recover the transmitted information. Alternatively, the base station determines the rate of a frame (i.e., the number of gated-on groups in the frame) through the use of the "Rate-Decision Algorithm," in well-known fashion.

It will be clear to those skilled in the art that because the number of power control groups in a frame is a constant, knowing the number of gated-on groups in the frame is tantamount to knowing the number of gated-off groups in the frame.

At step 205 in FIG. 2, the illustrative embodiment determines the number of power-down commands to transmit to or that have been transmitted to the wireless terminal in response to the signal strength of the power control groups in the frame, in well-known fashion. It will be clear to those skilled in the art that step 203 can be performed before or after or concurrently with step 205. Advantageously, after the base station has decided what rate the frame is, the base station examines the power level of each power control group in the frame and builds for each power control group a power-control message, in well-known fashion, that can comprise: (1) a power-down command, or (2) a power-up command. Referring to FIG. 5 again, the power level of the group #1 appears acceptable, the power level of group #2 appears acceptable, the power level of group #3 appears acceptable, etc. The power level of group #5, group #11 and group #12 appear too high and, therefore, the illustrative embodiment must transmit a power-down command for power control groups #5, #11 and #12 and a power-up command for power control groups #1–4, 6–10 and Therefore, there are three power-down commands being issued in response to this illustrative frame.

It will be clear to those skilled in the art that because the number of power-control messages transmitted in a frame is a constant, knowing the number of power-down commands for the frame is tantamount to knowing the number of power-up commands for the frame.

At step 207, the illustrative embodiment compares the number of power-down commands issued for the frame to the number of gated-on groups in the frame. If the number of power-down commands is equal to or greater than the number of gated-on groups in the frame, then control passes to step 211. It will be clear to those skilled in the art that the test of step 207 as expressed in the previous sentence is equivalent to the analogous expressions that are based on the number of power-up commands and the number of gated-off groups, or on the number of power-up commands and the number of gated-on groups, or on the number of power-down commands and the number of gated-off groups, because of the mathematical interrelationship of the number of power-down commands to the number of power-up commands and the number of gated-on groups to the number of gated-off groups.

At step 211 the frame is counted as a "violator," which means that the signal strength of most power control groups is too high, in general, and that the wireless terminal may be radiating inappropriately.

If the number of power-down commands is less than the number of gated-on groups in the frame, then control passes to step 209. At step 209, the frame is counted as a "non-violator," which means that although the signal strength of some power control groups is too high, in general, it appears that the wireless terminal is radiating appropriately.

At step 213, the illustrative embodiment advantageously adds the result of the last frame (i.e., whether the frame is a violator or a non-violator) to the results of the last m frames received from the wireless terminal. If n of the last m frames received have been counted as violators, then it can be reasonably surmised that the wireless terminal is radiating inappropriately (i.e., is malfunctioning) and must be addressed. Therefore, control passes to step 215 and a violation message is transmitted to the wireless terminal, in well-known fashion.

If less than n of the last m frames received have been counted as violators, then it cannot be reasonably surmised that the wireless terminal is radiating inappropriately. Therefore, control passes to step 201 and no violation message is transmitted to the wireless terminal.

By adjusting the values for n and m, an operator of the illustrative embodiment can adjust the likelihood that: (1) an appropriately behaved wireless terminal will be mistaken as an inappropriately behaved wireless terminal, (2) an inappropriately behaved wireless terminal will be mistaken as an appropriately behaved wireless terminal, and (3) then length of time that a malfunctioning wireless terminal will be permitted to misbehave before a violation message is transmitted to it.

For example, when n=m or n≈m and m is large, then the likelihood is small that an appropriately behaved wireless terminal will be mistaken as an inappropriately behaved wireless terminal. In contrast, when n<m or m is small, then the likelihood increases that an appropriately behaved wireless terminal will be mistaken as an inappropriately behaved wireless terminal. Clearly, it is disadvantageous for the illustrative embodiment to: (1) mistake an appropriately behaved wireless terminal as an inappropriately behaved wireless terminal, (2) mistake an inappropriately behaved wireless terminal as an appropriately behaved wireless terminal, or (3) allow a malfunctioning wireless terminal to radiate inappropriately for too long. It will be clear to those skilled in the art how to adjust the values of n and m for a particular embodiment of the present invention.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:

receiving at least one frame from a wireless terminal;

determining a number of gated-on groups in said at least one frame;

determining a number of power-down commands in response to said at least one frame; and counting said at least one frame as a violator when said number of power-down commands in response to said at least one frame equals or exceeds said number of gated-on groups in said at least one frame.

2. The method of claim 1 further comprising the step of counting said at least one frame as a non-violator when said number of power-down commands in response to said at least one frame is less than said number of gated-on groups in said at least one frame.

3. The method of claim 2 wherein said at least one frame comprises m frames, and further comprising the step of transmitting a violation message to said wireless terminal when n of said m frames have been counted as violators.

4. The method of claim 3 wherein n=m.

5. The method of claim 3 wherein n<m.

6. A method comprising:

receiving a frame from a wireless terminal;

treating said frame as comprising 16 gated-on groups when said frame is a full-rate frame;

treating said frame as comprising 8 gated-on groups when said frame is a half-rate frame;

treating said frame as comprising 4 gated-on groups when said frame is a quarter-rate frame;

treating said frame as comprising 2 gated-on groups when said frame is an eighth-rate frame;

determining a number of power-down commands in response to said frame;

counting said frame as a violator when said number of power-down commands in response to said frame equals 16 when said frame is a full-rate frame;

counting said frame as a violator when said number of power-down commands in response to said frame exceeds 7 when said frame is a half-rate frame;

counting said frame as a violator when said number of power-down commands in response to said frame exceeds 3 when said frame is a quarter-rate frame; and counting said frame as a violator when said number of power-down commands in response to said frame exceeds 1 when said frame is an eighth-rate frame.

7. The method of claim 6 further comprising the step of counting said frame as a non-violator when said number of power-down commands in response to said frame is less than said number of gated-on groups in said frame.

8. The method of claim 7 further comprising the step of transmitting a violation message to said wireless terminal when n of the last m received frames have been counted as violators.

9. The method of claim 8 wherein n=m.

10. The method of claim 8 wherein n<m.

11. A method comprising:

receiving m consecutive frames from a wireless terminal;

determining a number of gated-on groups in each of said m consecutive frames;

determining a number of power-down commands in response to each of said m consecutive frames;

counting each of said m consecutive frames as a violator when said number of power-down commands in response to each of said m consecutive frames equals or exceeds said number of gated-on groups in each of said ni consecutive frames; and transmitting a violation message to said wireless terminal when n of said m consecutive frames are violators.

12. The method of claim 11 further comprising the step of counting each of said m consecutive frames as a non-violator when said number of power-down commands in response to each of said m consecutive frames is less than said number of gated-on groups in each of said m consecutive frames.

13. The method of claim 11 wherein n=m.

14. The method of claim 11 wherein n<m.

15. A wireless telecommunications system that receives at least one frame from a wireless terminal, that determines a number of gated-on groups in said at least one frame, that determines a number of power-down commands in response to said at least one frame, characterized in that said at least one frame is counted as a violator when said number of power-down commands in response to said at least one frame equals or exceeds said number of gated-on groups in said at least one frame.

16. The wireless telecommunications system of claim 15 further characterized in that said at least one frame is counted as a non-violator when said number of power-down commands in response to said at least one frame is less than said number of gated-on groups in said at least one frame.

17. The wireless telecommunications system of claim 16 wherein said at least one frame comprises m frames, and further characterized by transmitting a violation message to said wireless terminal when n of said m frames have been counted as violators.

18. The wireless telecommunications system of claim 17 wherein n=m.

19. The wireless telecommunications system of claim 17 wherein n<m.

20. A wireless telecommunications system that receives m frames from a wireless terminal, characterized by determining a number of gated-on groups in each of said m frames;

determining a number of power-down commands in response to each of said m frames;

counting each of said m frames as a violator when said number of power-down commands in response to each of said m frames equals or exceeds said number of gated-on groups in each of said m frames; and transmitting a violation message to said wireless terminal when n of said m frames are violators.

21. The wireless telecommunications system of claim 20 further characterized by counting each of said m frames as a non-violator when said number of power-down commands in response to said each of said m frames is less than said number of gated-on groups in said each of said m frames.

22. The wireless telecommunications system of claim 20 wherein n=m.

23. The wireless telecommunications system of claim 20 wherein n<m.

* * * * *